(12) United States Patent
Pang

(10) Patent No.: US 12,287,841 B2
(45) Date of Patent: Apr. 29, 2025

(54) RUNTIME COMPLETION OF WEB COMPONENT METADATA

(71) Applicant: Oracle International Corporation, Redwood Shores, CA (US)

(72) Inventor: Li Pang, Vancouver (CA)

(73) Assignee: Oracle International Corporation, Redwood Shores, CA (US)

( * ) Notice: Subject to any disclaimer, the term of this patent is extended or adjusted under 35 U.S.C. 154(b) by 114 days.

(21) Appl. No.: 17/652,025

(22) Filed: Feb. 22, 2022

(65) Prior Publication Data

US 2023/0267163 A1 Aug. 24, 2023

(51) Int. Cl.
G06F 16/958 (2019.01)
G06F 8/30 (2018.01)
G06F 16/80 (2019.01)
H04L 67/02 (2022.01)

(52) U.S. Cl.
CPC .......... *G06F 16/972* (2019.01); *G06F 8/30* (2013.01); *G06F 16/80* (2019.01); *H04L 67/02* (2013.01)

(58) Field of Classification Search
None
See application file for complete search history.

(56) References Cited

U.S. PATENT DOCUMENTS

| 8,527,943 | B1 * | 9/2013 | Chiluvuri | G06F 8/36 717/111 |
| 10,824,791 | B2 * | 11/2020 | Solis | G06F 9/547 |
| 2003/0126195 | A1 | 7/2003 | Reynolds et al. | |
| 2004/0268228 | A1 * | 12/2004 | Croney | G06F 16/958 715/255 |
| 2010/0005527 | A1 * | 1/2010 | Jeon | G06F 9/547 726/22 |
| 2010/0161629 | A1 * | 6/2010 | Palanisamy | G06F 16/972 707/769 |

(Continued)

OTHER PUBLICATIONS

"A Quick Tour of Automatic Metadata Updates", Available Online at: https://desktop.arcgis.com/en/arcmap/latest/manage-data/metadata/a-quick-tour-of-automatic-metadata-updates.htm, Retrieved Sep. 4, 2021, 3 pages.

(Continued)

*Primary Examiner* — Jason D Mitchell
(74) *Attorney, Agent, or Firm* — MUGHAL GAUDRY & FRANKLIN PC

(57) ABSTRACT

Systems and methods described herein relate to runtime completion of web component metadata. Execution of a loader script of a web component may call a registration application programming interface (API) and provide component-specific metadata of the web component to the registration API. Execution of the registration API may provide a rendering engine with completed metadata of the web component, combining the component-specific metadata of the web component with a web component signature (e.g., a standard metadata signature that indicates a plurality of properties of the web component) to produce the completed metadata of the web component. The execution of the registration API may also store an entry in a component registry of the rendering engine that associates a name of the web component with the completed metadata of the web component.

21 Claims, 20 Drawing Sheets

(56) References Cited

U.S. PATENT DOCUMENTS

| | | | |
|---|---|---|---|
| 2011/0078555 A1* | 3/2011 | Crockett | G06F 16/9574 715/234 |
| 2011/0225487 A1* | 9/2011 | Harris | G06F 3/04855 715/235 |
| 2014/0229511 A1 | 8/2014 | Tung et al. | |
| 2016/0103815 A1* | 4/2016 | Suryadi | G06F 40/169 715/230 |
| 2016/0299664 A1 | 10/2016 | Khouri | |
| 2019/0065157 A1* | 2/2019 | Varadarajan | G06F 8/34 |
| 2019/0087419 A1 | 3/2019 | Kamalaksha et al. | |
| 2019/0163728 A1* | 5/2019 | Koren | G06F 40/137 |
| 2022/0156801 A1* | 5/2022 | Ross | G06F 16/958 |
| 2023/0086308 A1* | 3/2023 | Lim | G06F 16/9577 715/234 |

OTHER PUBLICATIONS

"A Quick Tour of Creating and Editing Metadata", Available Online at: https://desktop.arcgis.com/en/arcmap/latest/manage-data/metadata/a-quick-tour-of-creating-and-editing-metadata.htm, Retrieved Sep. 4, 2021, 4 pages.

"Build Automated Metadata Updates for Multi-Org Deployment", Available Online at: https://trailhead.salesforce.com/en/content/learn/modules/apex_metadata_api/apex_metadata_api_updates, Retrieved Sep. 4, 2021, 2 pages.

"Define a Component Signature", Available Online at: https://www3.rocketsoftware.com/rocketd3/support/documentation/Uniface/10/uniface/integration/signatures/tasks/Creating_a_new_signature.htm, Retrieved Sep. 4, 2021, 1 page.

"Metadata API Developer Guide", Available Online at: https://developer.salesforce.com/docs/atlas.en-us.api_meta.meta/api_meta/meta_updateMetadata.htm, Accessed from Internet on Feb. 9, 2021, pp. 1-4.

"Metadata Management", Available Online at: https://www.alteryx.com/solutions/analytics-need/data-discovery-management/metadata-management, Retrieved Sep. 4, 2021, 1 page.

"Update Descriptors (ULANA and USYSANA)", Available Online at: https://documentation.uniface.com/09/uniface/developmentRepository/tasks/UPDATING_USYSANA.htm, Retrieved Sep. 4, 2021, 1 page.

Olfat et al., "Spatial Metadata Automation: A Key to Spatially Enabling Platform", International Journal of Spatial Data Infrastructures Research, vol. 7, Available Online at: https://minervaaccess.unimelb.edu.au/bitstream/handle/11343/32585/284037_Spatial%20Metadata%20Automation-%20A%20Key%20to%20Spatially%20Enabling%20Platform.pdf, 2012, 24 pages.

Saputra et al., "A Metadata Approach for Building Web Application User Interface", Procedia Technology, vol. 11, 2013, pp. 903-911.

"Developing Applications with Oracle JET", Oracle JavaScript Extension Toolkit, Published Feb. 2021, 444 pages.

* cited by examiner sample-one-to-one-component/component.json, 1/4

```
{
  "name": "sample-one-to-one-component",
  "pack":"oj-psc-intake",
  "type":"composite",
  "version": "1.0.0",
  "jetVersion": "^9.1.0",
  "displayName": "Sample Intake Form Child Component - One to One Relationship",
  "description": "This is the sample one to one relationship child component to be used inside the intake form component of the Public Sector Community Development product.",
  "dependencies": {
    "oj-psc-intake-form": "1.0.0"
  },
  "extension": {
    "catalog": {
      "category": "Intake Form Sample Components"
    },
    "propertyLayout": [{
      "propertyGroup": "common",
      "displayName": "General",
      "items": ["intakeFormType", "versionType", "typeCode"]
    },
    {
      "propertyGroup": "data",
      "displayName": "Data",
      "items": ["layoutMetadata", "sourceData"]
    }
  ],
```

*Figure 6* sample-one-to-one-component/component.json, 2/4

```
"properties": {
  "intakeFormType": {
    "displayName": "Intake Form Type",
    "description": "This is the type of the intake form. It indicates whether the current intake form is for Permit, Planning and Zoning, Code Enforcement, or Business License, and so on.",
    "propertyGroup": "common",
    "required": true,
    "type": "string",
    "enumValues": ["LNP", "PZ", "CE", "LIC"]
  },
  "versionType": {
    "displayName": "Version Type",
    "description": "This is the version type of the intake form. It would be used to determine whether to show certain elements based on predefined criteria.",
    "propertyGroup": "common",
    "type": "string",
    "value": "NA",
    "enumValues": ["NA", "O", "A", "R"]
  },
  "typeCode": {
    "displayName": "Intake Form Type Code",
    "description": "This is the ID of the intake form record type.",
    "propertyGroup": "common",
    "required": true,
    "type": "string"
  },
  "layoutMetadata": {
    "displayName": "Layout Metadata",
    "description": "This is the layout metadata to render the component.",
    "propertyGroup": "data",
    "required": true,
    "type": "object"
  },
```

*Figure 7*

```
sample-one-to-one-component/component.json, 3/4
```

```
"sourceData": {
  "displayName": "Source Data",
  "description": "This is the source data to populate fields inside the component.",
  "propertyGroup": "data",
  "required": true,
  "type": "object"
},
"displayOptions": {
  "displayName": "Display Options",
  "description": "This is the advanced display options for the content area.",
  "type": "object",
  "properties": {
    "designMode": {
      "displayName": "Design Mode",
      "description": "This controls whether to render the component in design mode",
      "type": "boolean",
      "value": false
    },
    "baseAriaLevel": {
      "displayName": "Base Aria Level",
      "description": "This is the aria level of the top level headers in the content area.",
      "type": "number",
      "value": 3,
      "minimum": 3
    },
    "showEditableFieldsOnly": {
      "displayName": "Show editable fields only",
      "description": "This controls whether to show all fields or editable fields only based on the version type.",
      "type": "boolean",
      "value": true
    },
  },
};
```

*Figure 8* sample-one-to-one-component/component.json, 4/4

```
"methods": {},
"events": {
  "dataChanged": {
    "displayName": "Data Changed",
    "description": "Event to be dispatched after user makes any change to the component data.",
    "bubbles": false,
    "cancelable": false,
    "detail": {
      "source": {
        "description": "This is the source field metadata object or CCA metadata object that the user change occurred.",
        "type": "object"
      }
    }
  }
},
"slots": {}
}
```

*Figure 9* sample-one-to-one-component/loader.ts

```
import 'css!./sample-one-to-one-component-styles';
import Composite = require('ojs/ojcomposite');
import * as metadata from 'text!./component.json';
import * as view from 'text!./sample-one-to-one-component-view.html';
import {PsccfgSampleOneToOneComponentModel as viewModel} from './sample-one-to-one-component-viewModel';

(() => {
Composite.register('oj-psc-intake-sample-one-to-one-component', {
   metadata: JSON.parse(metadata),
   view,
   viewModel,
  });
})();
```

*Figure 10* sample-one-to-one-component (new)/component.json

```
{
  "name": "sample-one-to-one-component",
  "pack": "oj-psc-intake",
  "type": "composite",
  "version": "1.0.0",
  "jetVersion": "^9.1.0",
  "displayName": "Sample Intake Form Child Component - One to One Relationship",
  "description": "This is the sample one to one relationship child component to be used inside the intake form component of the Public Sector Community Development product.",
  "dependencies": {
    "oj-psc-intake-form": "1.0.0"
  },
  "extension": {
    "catalog": {
      "category": "Intake Form Sample Components"
    }
  }
}
```

*Figure 12* sample-one-to-one-component (new)/loader.ts

```
import { IntakeFormComponentRegistry } from 'oj-psc-intake/resources/js/designer/pscctg-component-templates';

// Component files
import { PsccfgSampleOneToOneComponentModel as viewModel } from './sample-one-to-one-component-viewModel';
import * as view from 'text!./sample-one-to-one-component-view.html';
import * as metadata from 'text!./component.json';
import 'css!./sample-one-to-one-component-styles';

( (): void => {

// Register the component to the intake form runtime
IntakeFormComponentRegistry.register('sample-one-to-one-component',
    'oj-psc-intake-sample-one-to-one-component',
        view,
        viewModel,
        JSON.parse(metadata)
    );

*Figure 14* from sample-one-to-one-component-viewModel.ts

```
export class PsccfgSampleOneToOneComponentModel implements Composite.ViewModel<Composite.PropertiesType> {
  public busyResolve: (() => void);
  public messages: PsccfgAnyConstant = {
    componentLabel: 'Sample One to One Relationship Component', // ?
  };
  public properties: PsccfgAnyConstant;
  public layoutObject: ko.Observable;
  public sourceData: ko.Observable<any>;
  public layoutDataReady: ko.Observable<boolean>;
  public fieldDataReady: ko.Observable<boolean>;
  public componentReady: ko.PureComputed<boolean>;

constructor(context: Composite.ViewModelContext<Composite.PropertiesType>) {
    const self: this = this;
    // Set the busy context property
    const elementContext: Context = Context.getContext(context.element);
    const busyContext: Context.BusyContext = elementContext.getBusyContext();
    const options: any = {'description': 'Initializing intake form sample one to one child component'};
    self.busyResolve = busyContext.addBusyState(options);

self.properties = {};
    self.properties.intakeFormType = ko.observable(context.properties.intakeFormType);
    self.properties.versionType = ko.observable(context.properties.versionType);
    self.properties.typeCode = ko.observable(context.properties.typeCode);

self.properties.layoutMetadata = ko.observable(context.properties.layoutMetadata);
    self.properties.sourceData = ko.observable(context.properties.sourceData);

self.properties.displayOptions = {};
    self.properties.displayOptions.designMode = ko.observable(context.properties.displayOptions.designMode);
    self.properties.displayOptions.baseAriaLevel = ko.observable(context.properties.displayOptions.baseAriaLevel);
    self.properties.displayOptions.showEditableFieldsOnly = ko.observable(context.properties.displayOptions.showEditableFieldsOnly);

// Once all startup and async activities have finished, resolve the busy context
    self.busyResolve();
  }
  ...
  ...
``` from sample-one-to-one-component-viewModel.ts (new)

```
...
export class PsccfgSampleOneToOneComponentModel
    extends IntakeFormFieldGroupViewModel
    implements Composite.ViewModel<Composite.PropertiesType> { constructor(context: Composite.ViewModelContext<Composite.PropertiesType>) {

// Call the super
    super(context);

const self = this;

// Set the busy context property
    const busyContext = Context.getContext(context.element).getBusyContext();
    const options = {'description': 'Initializing intake form sample one to one child component'};
    const busyResolve = busyContext.addBusyState(options);

//
    // TODO: add initialization code here
    //

// Once all startup and async activities have finished, resolve the busy context
    busyResolve();

};
...
```

*Figure 15* ant# RUNTIME COMPLETION OF WEB COMPONENT METADATA

FIELD

The present disclosure relates generally to web applications, and more particularly, to uses of web components.

BACKGROUND

A web component is a reusable piece of user interface (UI) that may be embedded as a custom HyperText Markup Language (HTML) element. Web components may be used to create new custom, reusable, modular, and/or encapsulated HTML tags for use in web pages and web applications ("web apps"). For example, web components may be used to incorporate custom functionality into a web application in a modular and reusable manner.

A web component may be composed of HTML, JavaScript, and/or Cascading Style Sheets (CSS). For example, a web component may contain one or more HTML files and one or more JavaScript files and may also include one or more CSS files. A web component may include one or more other web components.

Custom web components may be created and then used once they have been registered with a rendering engine. A web application consumes its child web components at runtime. The Oracle JavaScript Extension Toolkit (Oracle JET, Oracle Corporation® of Redwood Shores, California) is one example of a web application framework that may be used to create custom web components.

A web application framework may provide one or more libraries of web components and tools for combining existing web components to create custom web components. A developer creating a web application within such a framework may use web components from different teams, different repositories, and/or different framework versions together. Performing updates to the web components within a framework (e.g., to add functionality and/or to fix bugs) in a consistent manner may be challenging and/or tedious, and errors in the update process may lead to errors at runtime.

SUMMARY

Certain aspects and features of the present disclosure relate to a computer-implemented method for runtime completion of web component metadata. Execution of a loader script of a web component calls a registration application programming interface (API) and provides component-specific metadata of the web component to the registration API. Execution of the registration API provides a rendering engine with completed metadata of the web component, combining the component-specific metadata of the web component with a web component signature (e.g., a standard metadata signature that indicates a plurality of properties of the web component) to produce the completed metadata of the web component. The execution of the registration API also stores an entry in a component registry of the rendering engine that associates a name of the web component with the completed metadata of the web component.

In various embodiments, a computer-program product is provided that is tangibly embodied in a non-transitory machine-readable storage medium. The computer-program product can include instructions configured to cause one or more data processors to perform part or all of a method disclosed herein.

In various embodiments, a system is provided. The system can include one or more data processors and a non-transitory computer readable storage medium containing instructions which, when executed on the one or more data processors, cause the one or more data processors to perform part or all of a method disclosed herein.

The following detailed description together with the accompanying drawings will provide a better understanding of the nature and advantages of the present disclosure.

BRIEF DESCRIPTION OF THE DRAWINGS

Illustrative embodiments of the present invention are described in detail below with reference to the following drawing figures:

FIGS. 6-9 show one example of a metadata file associated with a web component.

FIG. 10 shows an example of a loader script file.

FIG. 12 shows an example of a metadata file associated with a web component in accordance with some embodiments.

FIG. 13 shows an example of a loader script file in accordance with some embodiments.

FIG. 14 shows an example of a class definition from a view model file for a web component.

FIG. 15 shows an example of a class definition from a view model file for a web component in accordance with some embodiments.

Figure 1:
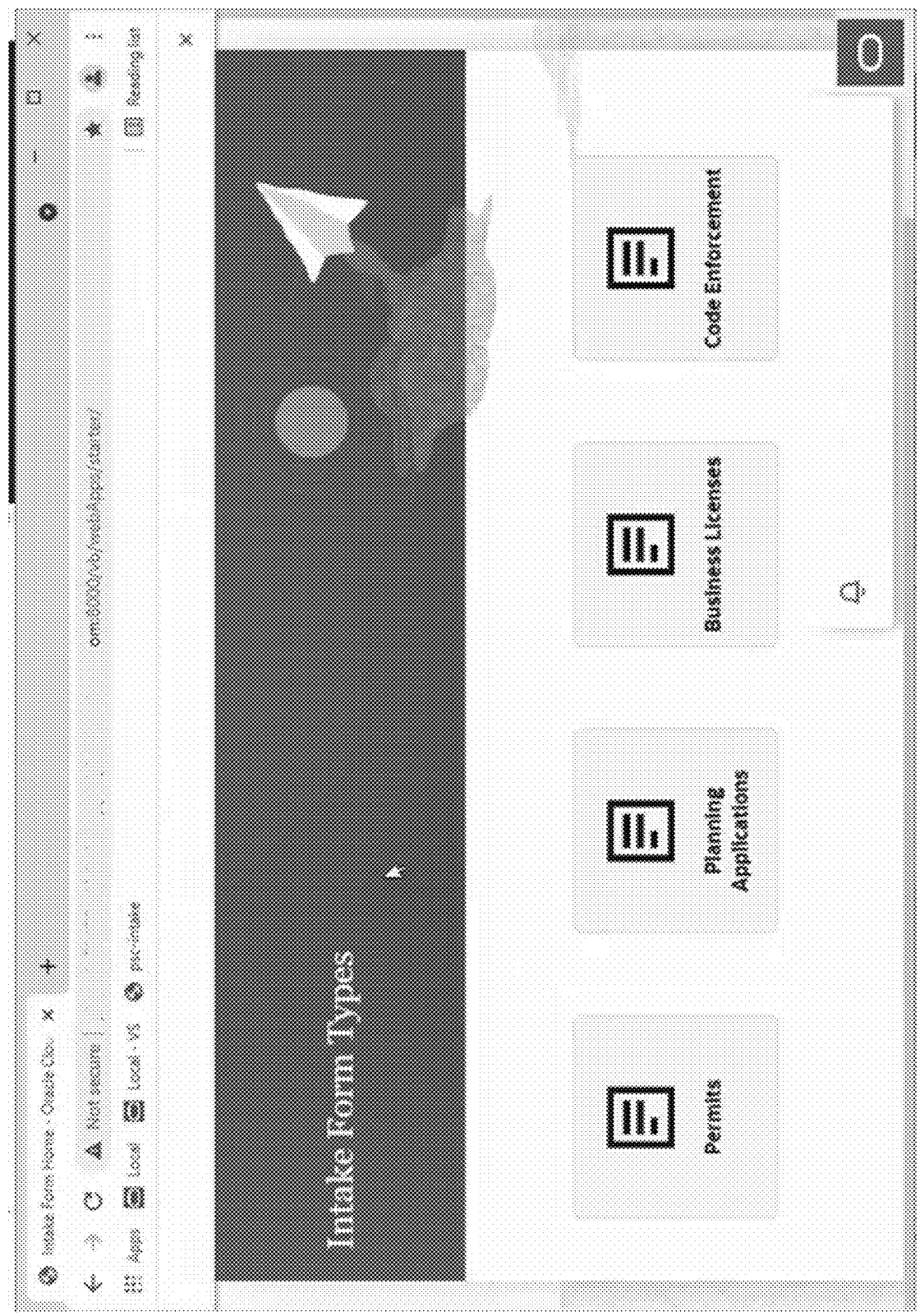
FIG. 1 shows an example of a web page that allows an end-user to select an intake form type in accordance with some embodiments.

In the appended figures, similar components and/or features can have the same reference label. Further, various components of the same type can be distinguished by following the reference label by a dash and a second label that distinguishes among the similar components. If only the

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

As used herein, the term "value" of a field refers to a number, text, a selection between multiple options, or a category.

As used herein, when an action is "based on" something, this means the action is based at least in part on at least a part of the something. As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

Overview

In some embodiments, systems and methods are provided for runtime completion of web component metadata. Such techniques may provide a solution to a static JSON-based metadata inheritance and extension problem by, for example, turning the problem into a code problem and then resolving it with object-oriented programming. Such techniques may allow a web application to centrally manage and enforce the web component signatures of child web components it consumes (e.g., executes at runtime) so that those web components will present the same signature to the rendering engine and so that the web components may communicate with each other freely. Such techniques may help to eliminate a need to constantly uptake the component signature changes in all consumed child web components, or to implement cross-version support inside those components individually. By bypassing a need for a snapshot and sync-up, such techniques may greatly reduce the maintenance effort required and/or allow web component developers to focus on their own web component-specific logic.

Systems and methods for runtime completion of web component metadata as described herein may allow a consuming web application to manipulate metadata of web components it consumes. For example, such a technique may allow a consuming web application to automatically fill in the web component signature of a child web component that it consumes at runtime.

A web application framework may include one or more runtime engines that allow a designer to create custom pages. For example, a runtime engine may be implemented as an "intake form engine" to allow a designer to create custom form templates by dragging-and-dropping components or fields to create page layouts. Each page layout may be saved as layout metadata (e.g., a list of web components). The runtime engine also allows an end-user to access the custom form templates that have been created in order to complete and submit forms online.

An example of a web application that may be used to enable end-users to complete and submit intake forms online is described with reference to FIGS. 1-4. Such an intake form may have multiple pages, and each page may have a different set of web components. A web component in such an application may contain, for example, a text field or a group of text fields (also called a "field group"). Each web component or field group may have different page controls, and each page control may be a web component itself.

Figure 2:
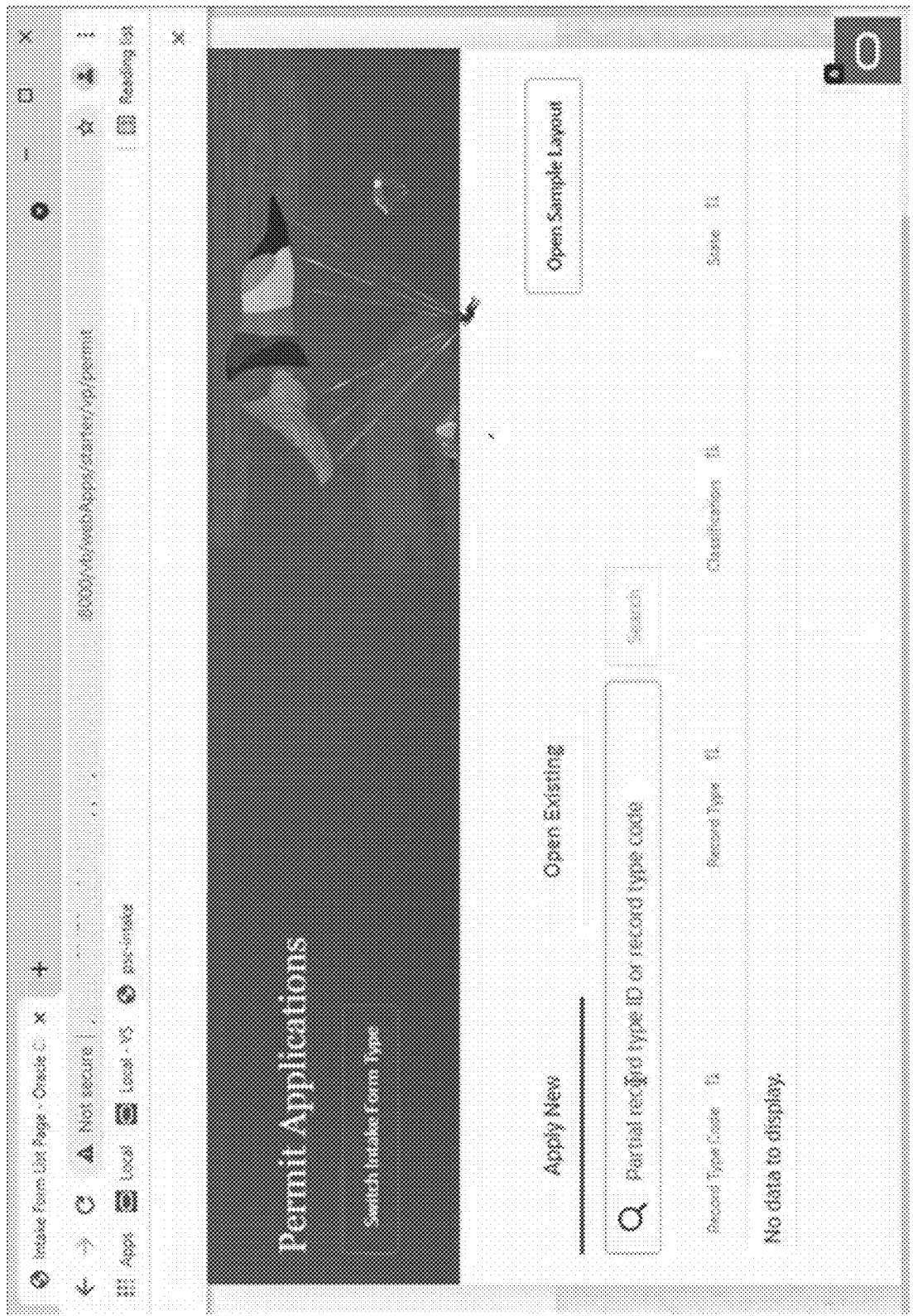
FIG. 2 shows an example of a web page that is generated in response to a selection of an end-user in accordance with some embodiments.
Figure 3:
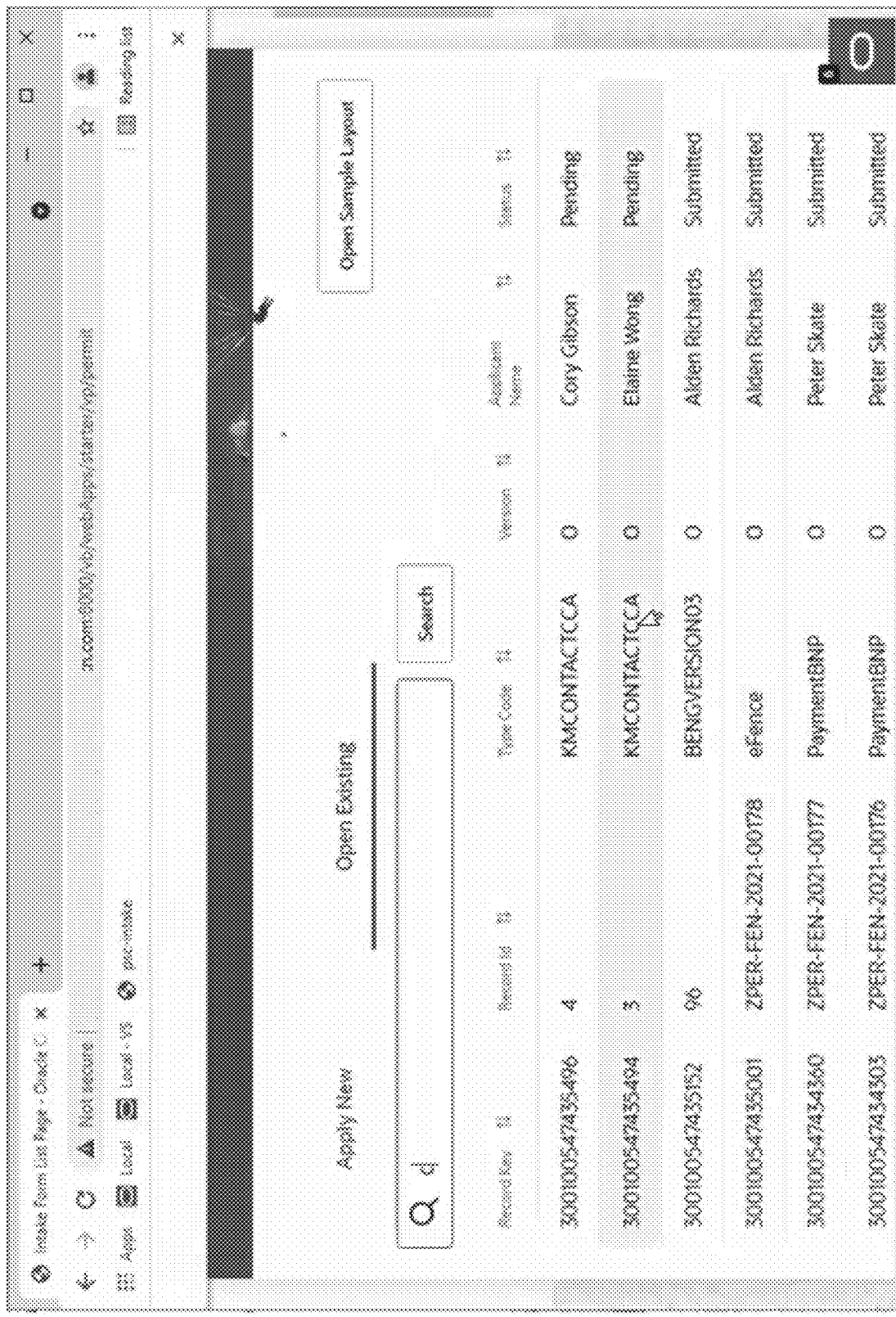
FIG. 3 shows an example of a web page that is generated in response to a selection of an end-user in accordance with some embodiments.
Figure 4:
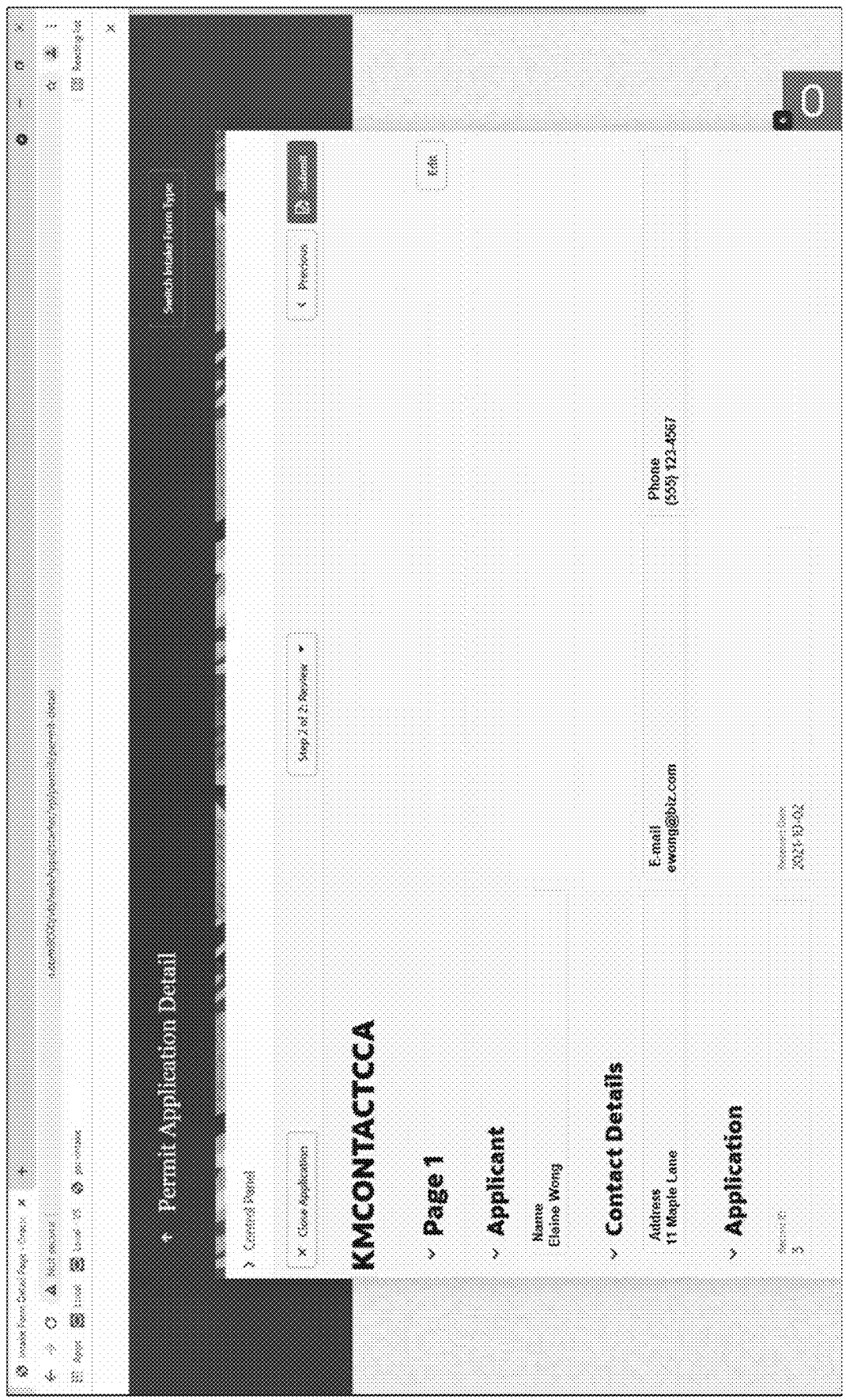
FIG. 4 shows an example of a selected form that has been opened and populated with previously entered data from a data store in accordance with some embodiments.

FIG. 1 shows an example of a web page that allows an end-user to select an intake form type. FIG. 2 shows an example of a web page that is generated in response to a selection of the intake form type "permit" by the end-user. This web page allows the end-user to select between beginning a new form or opening an existing form. FIG. 3 shows an example of a web page that is generated in response to a selection to open an existing form by the end user. This web page allows the end-user to select an existing form to open. FIG. 4 shows an example of a selected form that has been opened and populated with previously entered data from a data store.

Figure 5:
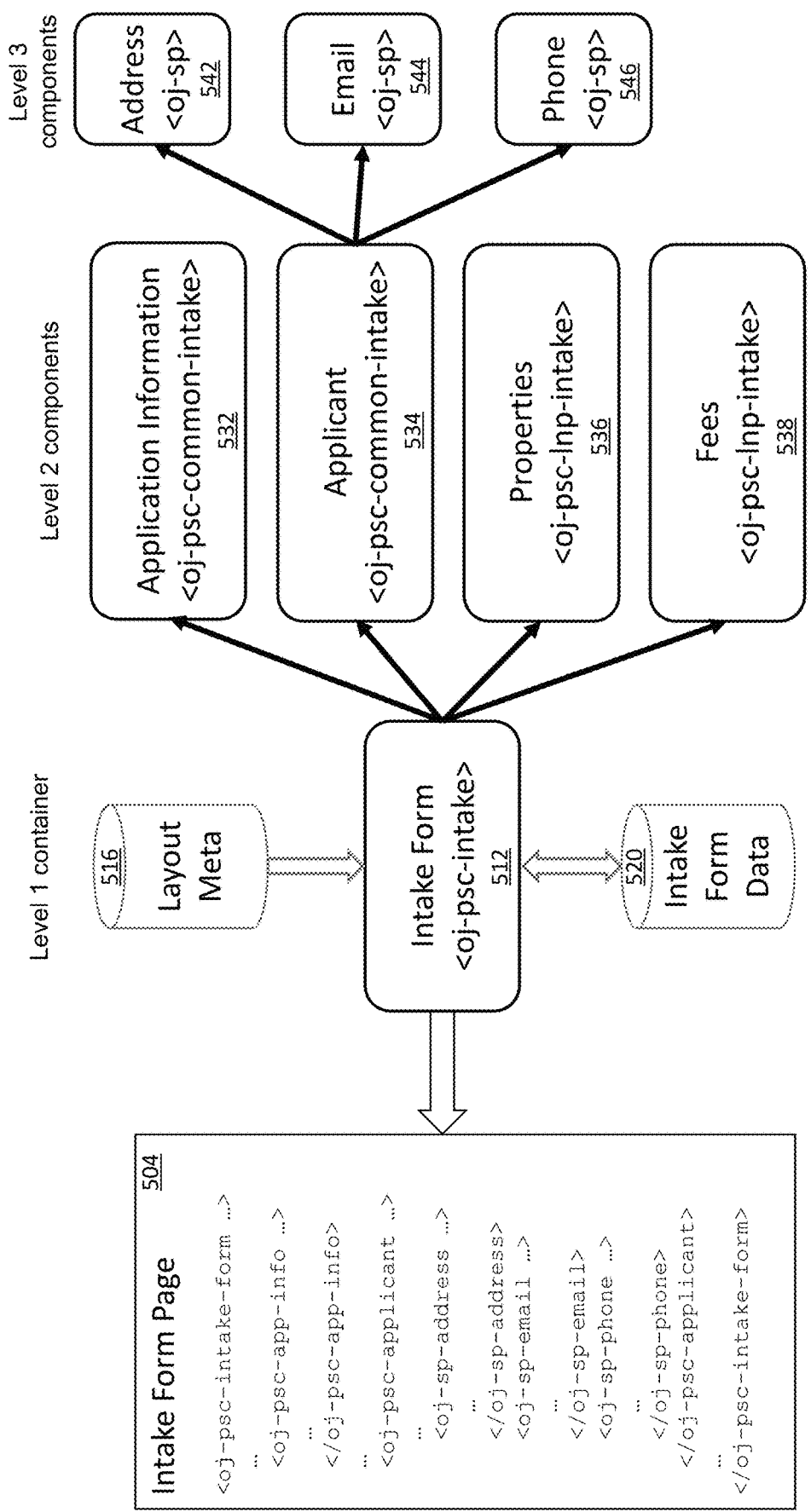
FIG. 5 shows an example of a hierarchy among web components that are embedded in an HTML, document in accordance with some embodiments.

FIG. 5 shows an example of a hierarchy among web components that are embedded in an HTML document. In this example, the HTML document is an intake form page 504 that initially includes only a top-level container (intake form 512). When an end-user selects a particular form at runtime, the component 512 may receive one or more parameter values that identify the selected form. The runtime engine may check a layout metadata data store 516 to determine the layout for the selected form and may generate corresponding additional HTML for the intake form page 504. The layout may indicate one or more web components (e.g., field groups). For example, the layout may indicate a list of field groups. If the parameter value(s) indicate that an existing intake form is to be opened, then the runtime engine may also load corresponding data from an intake form data store 520 for input to the intake form page 504.

A web component may use one or more other web components (e.g., from a next level down in a component hierarchy). In the example of FIG. 5, the top-level container 512 is a web component itself that is embedded in an HTML page, and it contains instances of each of the level 2 web components 532, 534, 536, and 538. Similarly, a level 2 web component may use one or more level 3 web components. In this example, the level 2 web component 534 contains instances of each of the level 3 web components 542, 544, and 546. The various web components available within a web application framework may be in different source control repositories and may be created and/or maintained by different teams.

Web Component Signature

Each web component may have a web component signature that defines characteristics of the web component. These characteristics may include, for example: the parameters the web component accepts as input, and the data types and values that these parameters may have; the events and event details that the web component fires (e.g., publishes to other web components, such as events that the web component can bubble); and/or the public methods (e.g., methods that are accessible both within and outside of the scope of the class in which they are defined) that may be invoked by applications that consume the web component. The web component signature may be implemented in a plain-text metadata file that is based on JavaScript Object Notation (JSON). The metadata of a web component may also include component-specific metadata, such as a name of the component (also called a tag), a framework version, and/or dependencies of the web component.

A JSON metadata file associated with a web component may define an application programming interface (API) of the component and may declare properties which will be exposed as attributes on the component tag. At design time, the metadata in the JSON file may be used by the web component stores for web component registration, web component search, and lifecycle management. At runtime, a loader script of the web component may execute (e.g., in response to a call by initialization code of the runtime engine during an initial scan of the static HTML portion of the page) to load the metadata and to register the component's name into a registry of the rendering engine, which links the registered name with the loaded metadata. The rendering engine may scan the static HTML portion of the page to interpret the custom elements, such as web components. For each component of the page, the rendering engine may check the component registry to find the component, and may invoke the component's code to render its content. The rendering engine may then use the metadata to render the web component (e.g., to generate corresponding HTML) and/or to communicate with the web component. Each custom element may contain other custom elements to be interpreted, and this process may be repeated for each component.

FIGS. 6-9 show one example of a JSON metadata file associated with a web component. This text file begins on FIG. 6, continues through FIGS. 7 and 8, and ends on FIG. 9. Component-specific metadata appears in FIG. 6 at the beginning of the file and includes the name of the component, the framework version, and the dependencies of the web component. The web component signature includes properties (as shown in FIGS. 7 and 8) and events (as shown in FIG. 9). In this example, the web component signature does not include any methods.

A consuming web application may require that some or all of the web components to be used within it have the same web component signature. For example, it may be required that all of the web components in the same level of the component hierarchy to have the same web component signature. In a hierarchy as shown in FIG. 5, for example, the runtime engine may require that all of the level 2 components 532, 534, 536, and 538 have the same signature. If such a requirement is not met, rendering of the page may not be successful.

Although a web component may not use all of the properties defined in its signature (for example, a web component may be agnostic as to the version of the framework), a problem may arise if unused properties of the signature are omitted from the web component's metadata. For example, the rendering engine may return an error upon detecting that a parameter is missing from the metadata or that a parameter is defined with values that are not understood.

Signature templates to be used with the web components of a web application framework may be delivered to a web application developer (e.g., as plain text files), and each signature template may define a standard set of properties, events, and methods. For each of the developer's web components, the developer may incorporate the signature into the web component by, for example, adding a copy of the template into the metadata file for the web component.

Changes to a Web Component Signature

From time to time, it may be desired to change a web component signature, for example, to introduce new functionalities or bug fixes. One example of such a change is described with reference to the web component metadata file shown at FIGS. 6 to 9. As shown in FIG. 7, the web component signature may include a property "intakeForm-Type" that has four enumerated values (as indicated by the dashed outline): "LNP" (indicating Permit), "PZ" (indicating Planning and Zoning), "CE" (indicating Code Enforcement), and "LIC" (indicating Business License). A developer may change this web component signature by, for example, adding another enumerated value to the property "intakeFormType" (e.g., "NC", indicating Name Change). The web application that consumes a web component having this updated web component signature may require that all other web components at the same level of the component hierarchy of a document being rendered have the same updated web component signature.

If the child web components that a runtime engine consumes directly were permitted to have different web component signatures, then the parameters that the runtime engine passes, and the methods that the runtime engine calls, could depend upon the web components that were currently being used. To support such operation, the runtime engine might need to maintain a large mapping table of each and every web component's signature. Maintaining such a mapping table in the consumer engine could impose a significant burden: for example, any update to an existing child web component, or any addition of a new child web component, could require an update to the mapping table.

Allowing web components to have different web component signatures could also complicate the process of generating layout metadata. For example, it might be necessary to provide a different set of metadata for each child web component, a parameter name might have different meanings depending on the web component, and so on. On the other hand, if all of the direct child web components (e.g., all of the web components that are direct children of the same parent in the component hierarchy of a document) have the same web component signature, then the runtime engine may not need to know which child web components are used in a layout, and the runtime engine may work with any current or future child web components that implement that standard web component signature.

Changes to web component signatures may be distributed (e.g., to the developers) as updated versions of the signature templates. Since each web component's metadata file already includes a copy of the old web component signature, incorporating the changes from the signature template may require a developer to manually edit each web component's metadata file. This updating process may often be time-consuming and/or error-prone, especially when the files to be updated may reside within hundreds of web components that may be distributed across multiple source code repositories. Updating of the web component signatures may also be complicated by a need to make sure that web components can work in different versions of the consuming application at the same time.

When a new version of a container (e.g., an intake form) is created, the container may no longer be in sync with the web components it embeds. For example, the latest version of the container may send five mandatory parameters for a property while the web component may take only four. But if the web component in this case is updated to take five parameters, it may no longer work with a previous version of the container or runtime engine. Such version mismatch is a very common problem.

Changes to a web component signature may affect other aspects of the web component as well. In addition to its metadata, a web component may also have a view file, a loader script file, and a view model file. The view file may describe how the component is to be displayed and may be implemented as static HTML. Execution of the loader script (e.g., a JavaScript file) may register the component with the rendering engine by, for example, adding the name of the web component to the component registry, loading the resources that are used to render the web component (e.g., its metadata and view model code), and linking the name of the web component in the registry with the loaded content. FIG. 10 shows an example of a loader script file that is written in TypeScript (TypeScript is a superset of JavaScript) and includes a call to the registration function Composite.register( ) which takes the name, metadata, view, and view model of the web component as input arguments.

The view model file may be code (e.g., static JavaScript) that is coupled with the view and describes how the properties of the component are to be interpreted. Execution of the view model code may generate dynamic content of the web component at runtime by interpreting input parameters of the web component to translate them into a class property or class method. If the web component signature is changed to include a new input parameter value (e.g., an additional enumerated value as described in the example above), the view model may be unable to interpret the new value.

For such reasons, when the signature template for a group of web components is updated, corresponding changes to the view model files for all of those web components may also be required. Again, the various web components may be in different source control repositories and may be created and/or maintained by different teams, and such a process may be tedious and/or prone to error and may lead to version mismatches.

Registration API

A method for runtime completion of web component metadata is described with reference to FIG. 11. This method may use a custom component-registration API (also called a "registration API" or "proxy API") to register the web components being consumed. The proxy API may be provided by the consuming web application.

Figure 11:
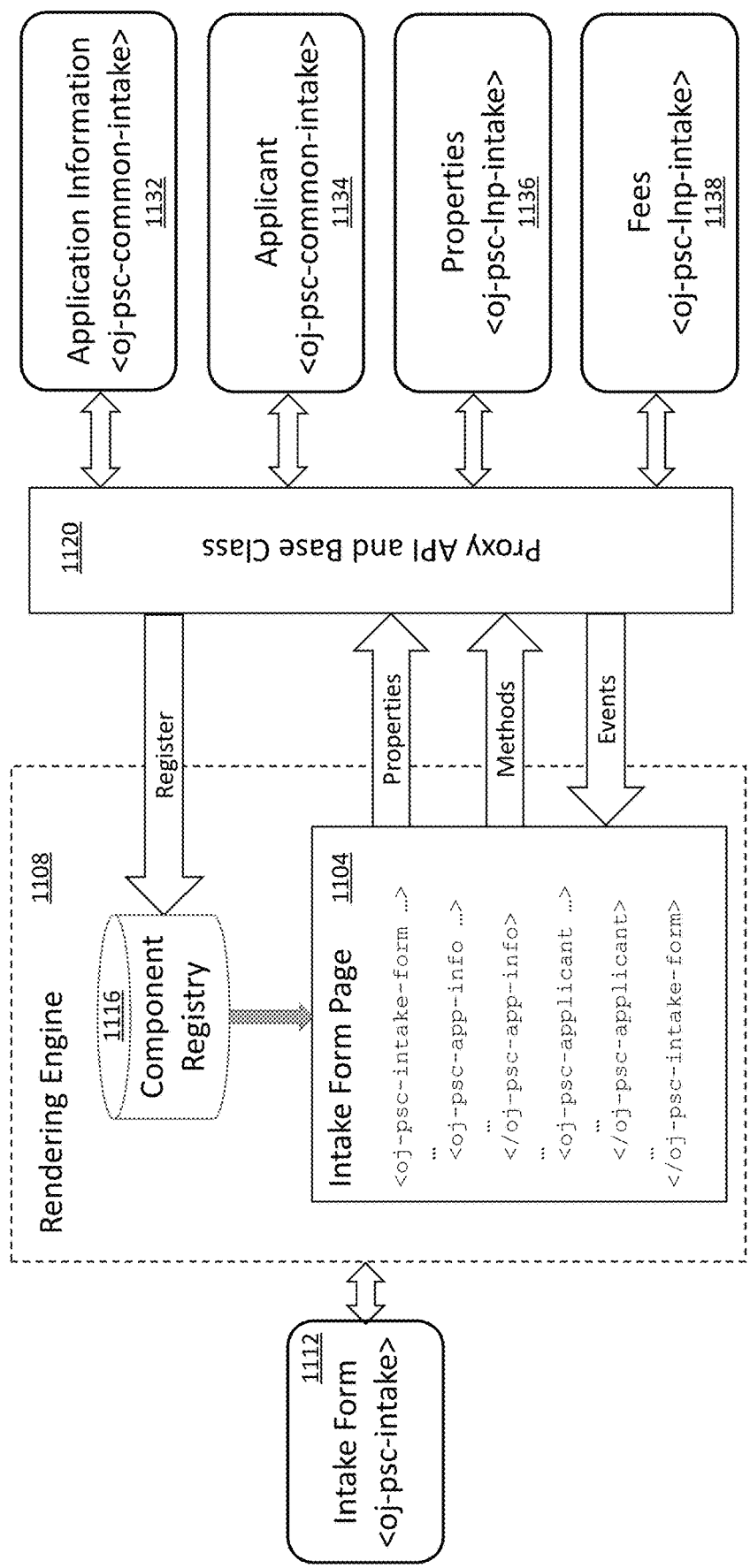
FIG. 11 shows a use of a method for runtime completion of web component metadata in accordance with some embodiments.

In the example of FIG. 11, each of the level 2 web components 1132, 1134, 1136, and 1138 may call the proxy API 1120 and provide its name and its component-specific metadata to the proxy API 1120. Execution of the proxy API 1120 may complete the metadata of the web component with a web component signature (e.g., a web component signature that includes a standard set of properties as described above). The web component signature may be encoded in the proxy API 1120 or may be retrieved by the proxy API 1120 from a template file. The execution of the proxy API 1120 may provide the completed metadata to the rendering engine and register the web component with the component registry 1116 of the rendering engine 1108 (e.g., by storing an entry in the component registry 1116 that associates a name of the web component with loaded resources of the web component). The web component may also provide additional resources (e.g., view and/or view model) to the proxy API for loading to the rendering engine and to be associated with the name of the web component in the component registry 1116.

FIG. 12 shows an example of a metadata file associated with a web component in accordance with a method as shown in FIG. 11. In contrast to the metadata file as shown in FIGS. 6-9, the metadata file in FIG. 12 includes only metadata that is specific to the web component (e.g., name, description, dependencies) and does not include the web component signature, which is auto-completed at runtime by the proxy API. A web application design process may be modified to account for an absence of the web component signature in the metadata file of the web component (e.g., as the complete metadata of the web component (e.g., including the web component signature) may be available only at runtime when the web component is registered to the rendering engine).

Each web component in a group of web components being consumed which are to have the same web component signature may call the same proxy API. Web components of different groups (e.g., web components which are to have different signatures) may call different proxy APIs.

FIG. 13 shows an example of a loader script file that is written in TypeScript (TypeScript is a superset of JavaScript) and includes a call to the proxy API IntakeFormComponentRegistry.register( ) As in the loader script file example shown in FIG. 10, this function call takes the name, metadata, view, and view model of the web component as input arguments. In this case, however, the metadata provided by the web component includes component-specific metadata and does not include the web component signature, which is provided by the proxy API to auto-complete the metadata of the web component. The execution of the proxy API may combine the component-specific metadata and the web component signature before loading the completed metadata to the rendering engine, or the execution of the proxy API may complete the metadata of the web component by loading both of the component-specific metadata and the web component signature to the rendering engine.

Base Class

As discussed above, changes to a web component signature may lead to changes to other aspects of the web component as well: for example, to allow for a new parameter value to be interpreted. Previously such a change to the signature would be supported by a corresponding change to the view model code, which interprets the parameters. Incorporating such changes into the signature and view model code of every component may be difficult, as it may involve a lot of code change across different teams and/or source control build cycles.

In addition to auto-completing web component metadata at runtime, a proxy API as described above may be implemented to provide a base class that handles interpretation of the web component (e.g., translation of class properties, methods, and events which the rendering engine may pass to the component) at runtime. Updates to accommodate changes in the web component signature may be made centrally to this base class, and such changes may be propagated to web components using the proxy API automatically at runtime. As noted above, the proxy API may be provided by the consuming web application.

FIG. 14 shows an example of a class definition from a view model file for a web component that lacks such a base class. The code indicated by the dashed outline indicates how the various properties of the web component are to be handled at runtime. Changes to the web component signature that affect these properties may give rise to errors at runtime unless this code is updated accordingly.

FIG. 15 shows another example of a class definition from a view model file for a web component. In this case, the class being defined is a child instance of a base class IntakeFormFieldGroupViewModel, which may be provided by the proxy API that is called to register the web component. In order to access the context of this base class, the web component's view model code may use the super keyword (as indicted by the dashed outline) to call the constructor of the parent base class. Changes to the base class (e.g., to define the interpretation of a new parameter value) may be propagated through to the web component without changing its view model code.

In such manner, execution of the view model code of a web component may implement a base class provided by the consuming application, which may interact with the rendering engine to interpret a standard set of properties passed to the web component and keep track of property value changes passed down from the rendering engine. The base class may also provide a default implementation of standard methods, which may be extended by a web component to provide additional functionalities should the need arise. Additionally or alternatively, a web component may also use one or more utility functions of such a base class (e.g., to fire standard events).

Systems and methods for runtime completion of web component metadata as described herein may allow new parameters to be added to a web component without changing the code of the web component itself. The web component version may remain the same, and the same web component code may be used with different versions of the web application (e.g., different versions of the runtime engine). The same web component may be used in different versions of the container component. Although old versions of the web application may not support the new parameters, this lack does not affect the web component code.

Although the signature of the proxy API may remain the same across different versions, the implementation of the proxy API may differ in different versions. For example, the content added by the proxy API may differ among different versions of the web application (e.g., one version of the proxy API may provide fewer input parameters from the signature than another version of the proxy API).

Systems and methods for runtime completion of web component metadata as described herein may allow a consuming web application to automatically fill in the component signature at runtime for child web components it consumes. Each web component may keep only component-specific properties in its metadata file. Such properties may include, for example, the name, version, dependencies, etc. of the component. This component-specific information may be used by component stores for component registration, component search, and so on. The rest of the web component signature (e.g., the standard properties, events, and methods) may be filled in by the consuming application at runtime, when the web component registers itself to the rendering engine. Such runtime completion may make it unnecessary to uptake component signature changes in individual web components. Meanwhile, the consuming application may also provide APIs for web components to interpret the standard set of properties or to fire events. The default implementations of standard methods may also be provided. Since both the component signature and component signature implementation may be filled-in or provided by the same consuming application at runtime, the web component would not need to handle a version mismatch problem itself.

Exemplary Process for Runtime Completion of Web Component Metadata

Figure 16:
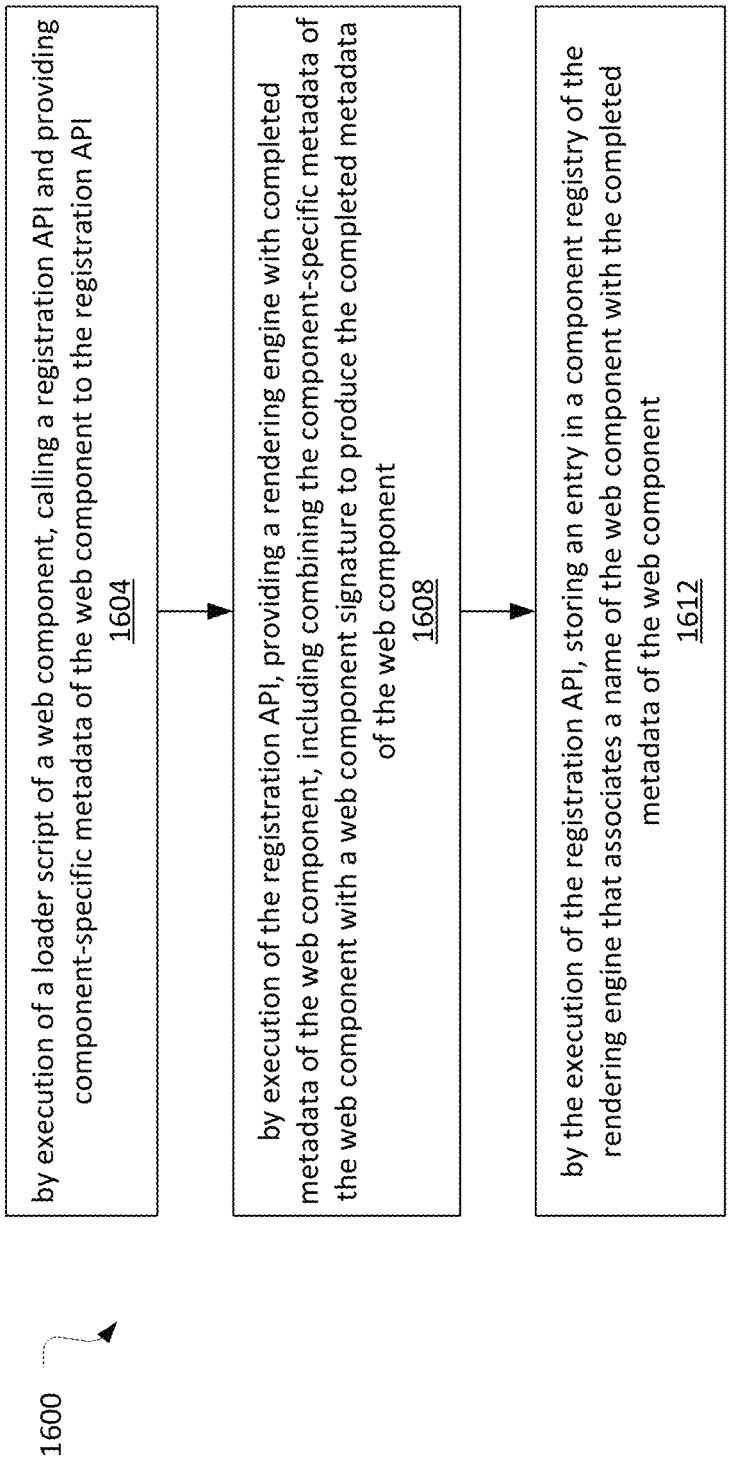
FIG. 16 illustrates an exemplary process for runtime completion of web component metadata according to some embodiments.

FIG. 16 illustrates an exemplary process 1600 for runtime completion of web component metadata according to some embodiments. The processing depicted in FIG. 16 may be implemented in software (e.g., code, instructions, programs) executed by one or more processing units (e.g., processors, cores) of the respective systems, hardware, or combinations thereof. The software may be stored on a non-transitory storage medium (e.g., on a memory device). The method presented in FIG. 16 and described below is intended to be illustrative and non-limiting. Although FIG. 16 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 16 may be performed by a web application that consumes a web component at runtime.

At block 1604, execution of a loader script of a web component calls a registration API and provides component-specific metadata of the web component to the registration API. The component-specific metadata of the web component may include the name of the web component. The web component may be a field group.

At block 1608, execution of the registration API provides a rendering engine with completed metadata of the web component. Providing the rendering engine with the completed metadata of the web component includes combining the component-specific metadata of the web component with a web component signature to produce the completed metadata of the web component. For example, providing the rendering engine with the completed metadata of the web component may include loading the completed metadata of the web component to the rendering engine. Alternatively, combining the component-specific metadata of the web component with the web component signature to produce the completed metadata of the web component may include loading the component-specific metadata of the web component to the rendering engine and loading the web component signature to the rendering engine.

The web component signature indicates a plurality of properties of the web component. The web component signature may indicate at least one method of the web component or at least one event of the web component.

At block 1612, the execution of the registration API stores an entry in a component registry of the rendering engine that associates a name of the web component with the completed metadata of the web component. The properties among the plurality of properties may be properties to be exposed as attributes on the name of the web component.

In process 1600, the execution of the loader script of the web component may provide a view model of the web component to the registration API, and the view model of the web component may comprise a script. In such cases, the registration API may define a base class, and the view model of the web component may include a child instance of the base class.

In process 1600, the execution of the loader script of the web component may provide a view of the web component to the registration API, and the view of the web component may comprise a static HTML, file.

Figure 17:
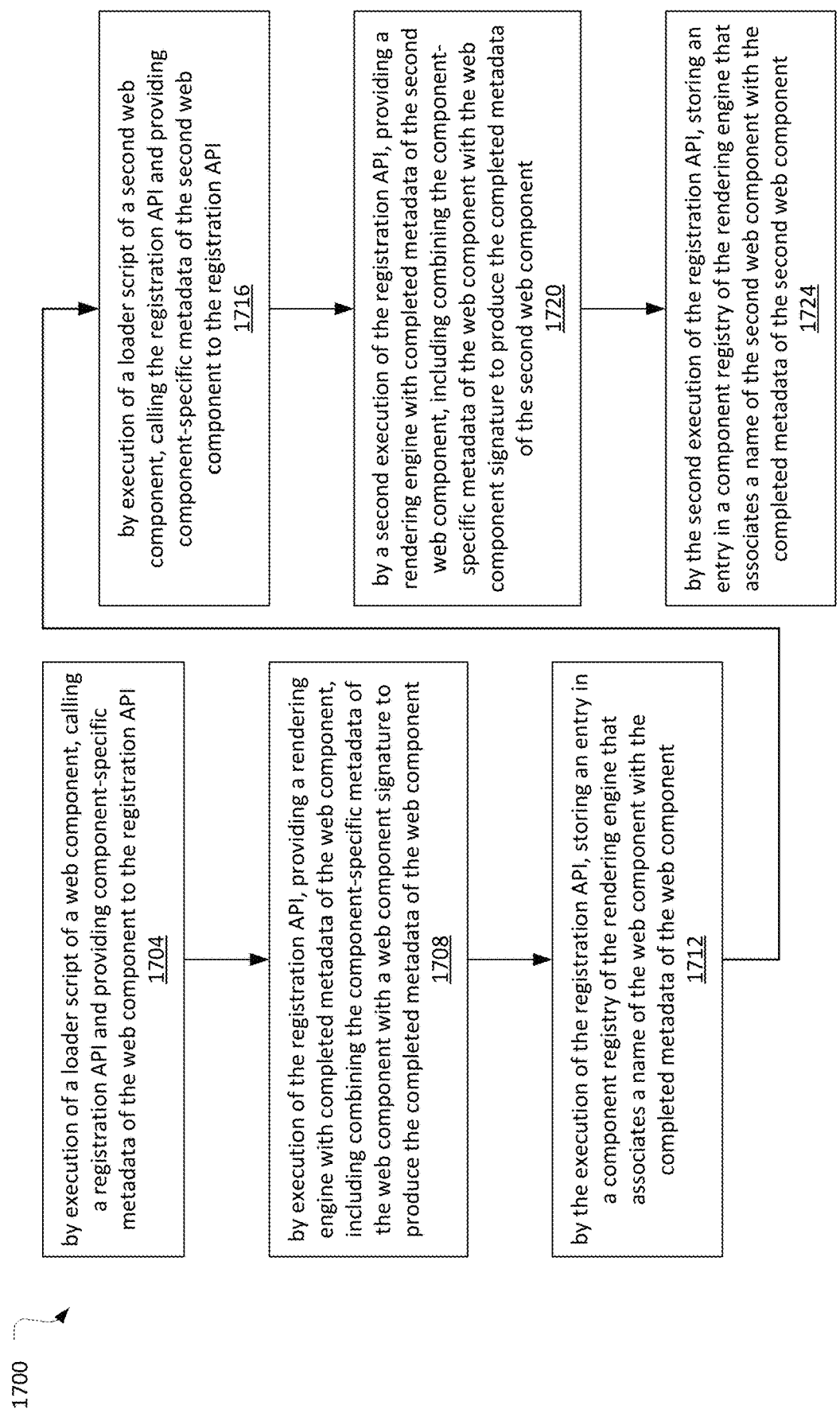
FIG. 17 illustrates another exemplary process for runtime completion of web component metadata according to some embodiments.

FIG. 17 illustrates an exemplary process 1700 for runtime completion of web component metadata according to some embodiments. The processing depicted in FIG. 17 may be implemented in software (e.g., code, instructions, programs) executed by one or more processing units (e.g., processors, cores) of the respective systems, hardware, or combinations thereof. The software may be stored on a non-transitory storage medium (e.g., on a memory device). The method presented in FIG. 17 and described below is intended to be illustrative and non-limiting. Although FIG. 17 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 17 may be performed by a web application that consumes a web component at runtime.

Block 1704 may be implemented according to any of the descriptions of corresponding block 1604 above; block 1708 may be implemented according to any of the descriptions of corresponding block 1608 above; and block 1712 may be implemented according to any of the descriptions of corresponding block 1612 above.

At block 1716, execution of a loader script of a second web component calls the registration API and provides component-specific metadata of the second web component to the registration API. The component-specific metadata of the second web component may include a name of the second web component. The second web component may be a field group. The web component and the second web component may be used by a document being rendered, and the second web component may be at the same level of a component hierarchy of the document as the web component.

At block 1720, a second execution of the registration API provides a rendering engine with completed metadata of the second web component. Providing the rendering engine with the completed metadata of the second web component includes combining the component-specific metadata of the second web component with the web component signature to produce the completed metadata of the second web component. For example, providing the rendering engine with the completed metadata of the second web component may include loading the completed metadata of the second web component to the rendering engine. Alternatively, combining the component-specific metadata of the second web component with the web component signature to produce the completed metadata of the second web component may include loading the component-specific metadata of the second web component to the rendering engine and loading the web component signature to the rendering engine.

The web component signature indicates a plurality of properties of the second web component. The web component signature may indicate at least one method of the second web component or at least one event of the second web component.

At block 1724, the second execution of the registration API stores an entry in the component registry of the rendering engine that associates a name of the second web component with the completed metadata of the second web component. The properties among the plurality of properties may be properties to be exposed as attributes on the name of the second web component.

In process 1700, the execution of the loader script of the second web component may provide a view model of the second web component to the registration API, and the view model of the second web component may comprise a script. In such cases, the registration API may define a base class, and the view model of the second web component may include a child instance of the base class.

In process 1700, the execution of the loader script of the second web component may provide a view of the web component to the registration API, and the view of the second web component may comprise a static HTML, file.

Illustrative Systems

Figure 18:
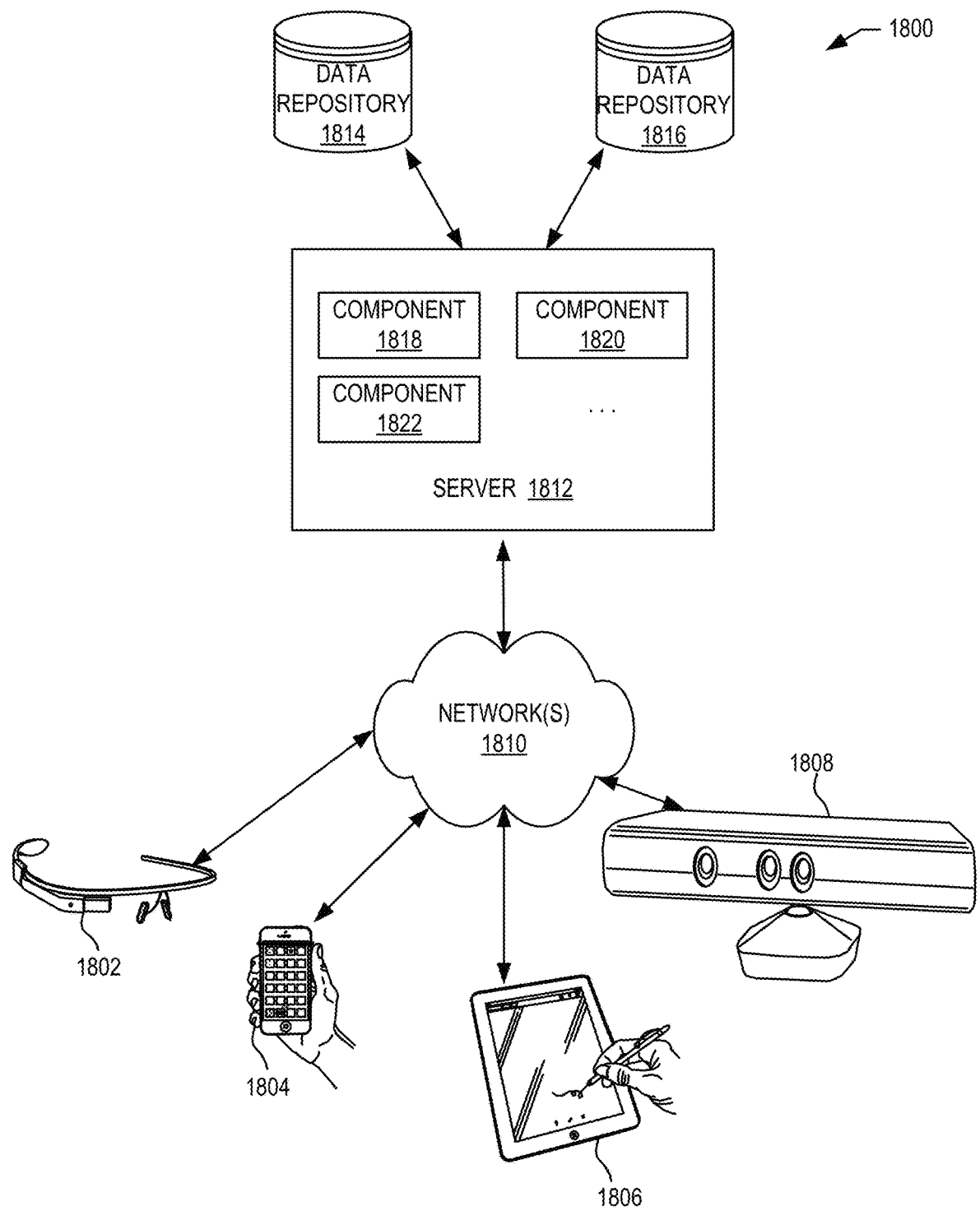
FIG. 18 depicts a simplified diagram of a distributed system for implementing one of the embodiments.

FIG. 18 depicts a simplified diagram of a distributed system 1800. In the illustrated example, distributed system 1800 includes one or more client computing devices 1802, 1804, 1806, and 1808, coupled to a server 1812 via one or more communication networks 1810. Client computing devices 1802, 1804, 1806, and 1808 may be configured to execute one or more applications.

In various examples, server 1812 may be adapted to run one or more services or software applications that enable one or more embodiments described in this disclosure. In certain examples, server 1812 may also provide other services or software applications that may include non-virtual and virtual environments. In some examples, these services (e.g., web applications that consume web components) may be offered as web-based or cloud services, such as under a Software as a Service (SaaS) model to the users of client computing devices 1802, 1804, 1806, and/or 1808. Users operating client computing devices 1802, 1804, 1806, and/or 1808 may in turn utilize one or more client applications to interact with server 1812 to utilize the services provided by these components.

In the configuration depicted in FIG. 18, server 1812 may include one or more components 1818, 1820 and 1822 that implement the functions performed by server 1812. These components may include software components that may be executed by one or more processors, hardware components, or combinations thereof. It should be appreciated that various different system configurations are possible, which may be different from distributed system 1800. The example shown in FIG. 18 is thus one example of a distributed system for implementing an example system and is not intended to be limiting.

Users may use client computing devices 1802, 1804, 1806, and/or 1808 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 18 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1810 may be any type of network familiar to those skilled in the art that may support data communications using any of a variety of available protocols, including without limitation TCP/IP (transmission control protocol/

Internet protocol), SNA (systems network architecture), IPX (Internet packet exchange), AppleTalk®, and the like. Merely by way of example, network(s) 1810 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1812 may include one or more virtual machines running virtual operating systems, or other computing architectures involving virtualization such as one or more flexible pools of logical storage devices that may be virtualized to maintain virtual storage devices for the server. In various examples, server 1812 may be adapted to run one or more services or software applications that provide the functionality described in the foregoing disclosure.

The computing systems in server 1812 may run one or more operating systems including any of those discussed above, as well as any commercially available server operating system. Server 1812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1812 may include one or more applications to analyze and consolidate data feeds and/or event updates received from users of client computing devices 1802, 1804, 1806, and 1808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1812 may also include one or more applications to display the data feeds and/or real-time events via one or more display devices of client computing devices 1802, 1804, 1806, and 1808. In some implementations, server 1812 may include one or more web applications that consume web components as described herein.

Distributed system 1800 may also include one or more data repositories 1814, 1816. These data repositories may be used to store data and other information in certain examples. For example, one or more of the data repositories 1814, 1816 may be used to store information such as information related to chatbot performance or generated models for use by chatbots used by server 1812 when performing various functions in accordance with various embodiments. Data repositories 1814, 1816 may reside in a variety of locations. For example, a data repository used by server 1812 may be local to server 1812 or may be remote from server 1812 and in communication with server 1812 via a network-based or dedicated connection. Data repositories 1814, 1816 may be of different types. In certain examples, a data repository used by server 1812 may be a database, for example, a relational database, such as databases provided by Oracle Corporation® and other vendors. One or more of these databases may be adapted to enable storage, update, and retrieval of data to and from the database in response to SQL-formatted commands. Databases 1814 and 1816 may include (for example) one or more web components as described herein.

In certain examples, one or more of data repositories 1814, 1816 may also be used by applications to store application data. The data repositories used by applications may be of different types such as, for example, a key-value store repository, an object store repository, or a general storage repository supported by a file system.

Figure 19:
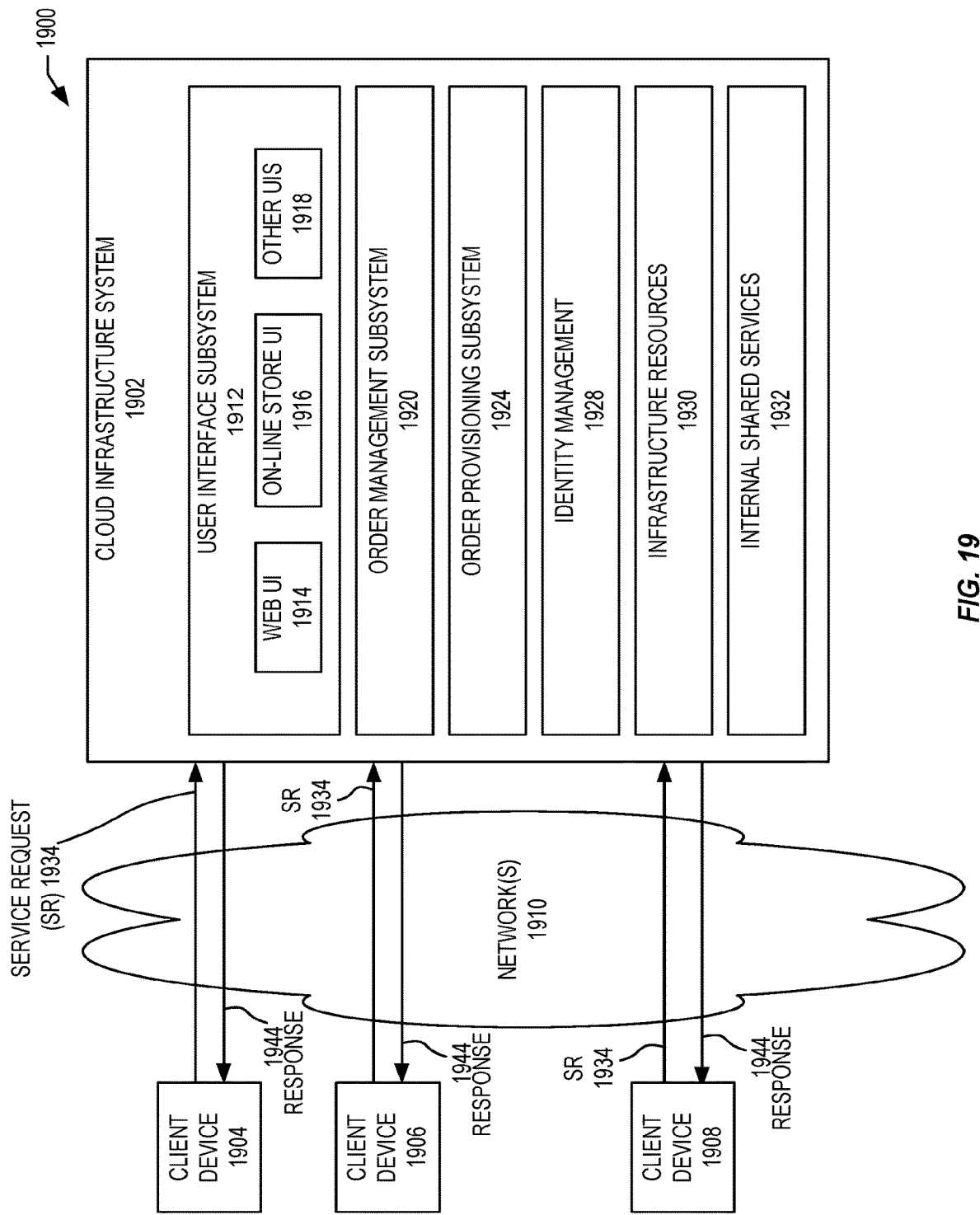
FIG. 19 is a simplified block diagram of components of a system environment by which services provided by the components of an embodiment system may be offered as cloud services, in accordance with an embodiment of the present disclosure.

In certain examples, the functionalities described in this disclosure may be offered as services via a cloud environment. FIG. 19 is a simplified block diagram of a cloud-based system environment in which various services may be offered as cloud services in accordance with certain examples. In the example depicted in FIG. 19, cloud infrastructure system 1902 may provide one or more cloud services that may be requested by users using one or more client computing devices 1904, 1906, and 1908. Cloud infrastructure system 1902 may comprise one or more computers and/or servers that may include those described above for server 1812. The computers in cloud infrastructure system 1902 may be organized as general purpose computers, specialized server computers, server farms, server clusters, or any other appropriate arrangement and/or combination.

Network(s) 1910 may facilitate communication and exchange of data between clients 1904, 1906, and 1908 and cloud infrastructure system 1902. Network(s) 1910 may include one or more networks. The networks may be of the same or different types. Network(s) 1910 may support one or more communication protocols, including wired and/or wireless protocols, for facilitating the communications.

The example depicted in FIG. 19 is only one example of a cloud infrastructure system and is not intended to be limiting. It should be appreciated that, in some other examples, cloud infrastructure system 1902 may have more or fewer components than those depicted in FIG. 19, may combine two or more components, or may have a different configuration or arrangement of components. For example, although FIG. 19 depicts three client computing devices, any number of client computing devices may be supported in alternative examples.

The term cloud service is generally used to refer to a service that is made available to users on demand and via a communication network such as the Internet by systems (e.g., cloud infrastructure system 1902) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 1902 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1902 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1902. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1902. Cloud infrastructure system 1902 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 1902 may be configured to provide one or even multiple cloud services.

Cloud infrastructure system 1902 may provide the cloud services via different deployment models. In a public cloud model, cloud infrastructure system 1902 may be owned by a third party cloud services provider and the cloud services are offered to any general public customer, where the customer may be an individual or an enterprise. In certain other examples, under a private cloud model, cloud infrastructure system 1902 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1902 and the services provided may be shared by several organizations in a related community. Various other models such as hybrids of the above mentioned models may also be used.

Client computing devices 1904, 1906, and 1908 may be of different types (such as client computing devices 1802, 1804, 1806, and 1808 depicted in FIG. 18) and may be capable of operating one or more client applications. A user may use a client device to interact with cloud infrastructure system 1902, such as to request a service provided by cloud infrastructure system 1902. For example, a user may use a client device to request information or action from a chatbot as described in this disclosure.

In some examples, the processing performed by cloud infrastructure system 1902 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 1902 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 19, cloud infrastructure system 1902 may include infrastructure resources 1930 that are utilized for facilitating the provision of various cloud services offered by cloud infrastructure system 1902. Infrastructure resources 1930 may include, for example, processing resources, storage or memory resources, networking resources, and the like. In certain examples, the storage virtual machines that are available for servicing storage requested from applications may be part of cloud infrastructure system 1902. In other examples, the storage virtual machines may be part of different systems.

In certain examples, to facilitate efficient provisioning of these resources for supporting the various cloud services provided by cloud infrastructure system 1902 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1902 may itself internally use services 1932 that are shared by different components of cloud infrastructure system 1902 and which facilitate the provisioning of services by cloud infrastructure system 1902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1902 may comprise multiple subsystems. These subsystems may be implemented in software, or hardware, or combinations thereof. As depicted in FIG. 19, the subsystems may include a user interface subsystem 1912 that enables users or customers of cloud infrastructure system 1902 to interact with cloud infrastructure system 1902. User interface subsystem 1912 may include various different interfaces such as a web interface 1914, an online store interface 1916 where cloud services provided by cloud infrastructure system 1902 are advertised and are purchasable by a consumer, and other interfaces 1918. For example, a customer may, using a client device, request (service request 1934) one or more services provided by cloud infrastructure system 1902 using one or more of interfaces 1914, 1916, and 1918. For example, a customer may access the online store, browse cloud services offered by cloud infrastructure system 1902, and place a subscription order for one or more services offered by cloud infrastructure system 1902 that the customer wishes to subscribe to. The service request may include information identifying the customer and one or more services that the customer desires to subscribe to. For example, a customer may place a subscription order for a service offered by cloud infrastructure system 1902. As part of the order, the customer may provide information identifying a chatbot system for which the service is to be provided and optionally one or more credentials for the chatbot system.

In certain examples, such as the example depicted in FIG. 19, cloud infrastructure system 1902 may comprise an order management subsystem (OMS) 1920 that is configured to process the new order. As part of this processing, OMS 1920 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1920 may then invoke the order provisioning subsystem (OPS) 1924 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1924 may be configured to determine the particular cloud service being requested and identify a number of pods that may have been pre-configured for that particular cloud service. The number of pods that are allocated for an order may depend upon the size/amount/level/ scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1902 as part of the provisioning process. Cloud infrastructure system 1902 may generate an application ID and select a storage virtual machine for an application from among storage virtual machines provided by cloud infrastructure system 1902 itself or from storage virtual machines provided by other systems other than cloud infrastructure system 1902.

Cloud infrastructure system 1902 may send a response or notification 1944 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 1902 and information identifying a chatbot system selected by cloud infrastructure system 1902 for the chatbot system corresponding to the chatbot system ID.

Cloud infrastructure system 1902 may provide services to multiple customers. For each customer, cloud infrastructure system 1902 is responsible for managing information related to one or more subscription orders received from the customer, maintaining customer data related to the orders, and providing the requested services to the customer. Cloud infrastructure system 1902 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1902 may provide services to multiple customers in parallel. Cloud infrastructure system 1902 may store information for these customers, including possibly proprietary information. In certain examples, cloud infrastructure system 1902 comprises an identity management subsystem (IMS) 1928 that is configured to manage customer information and provide the separation of the managed information such that information related to one customer is not accessible by another customer. IMS 1928 may be configured to provide various security-related services such as identity services, such as information access management, authentication and authorization services, services for managing customer identities and roles and related capabilities, and the like.

Figure 20:
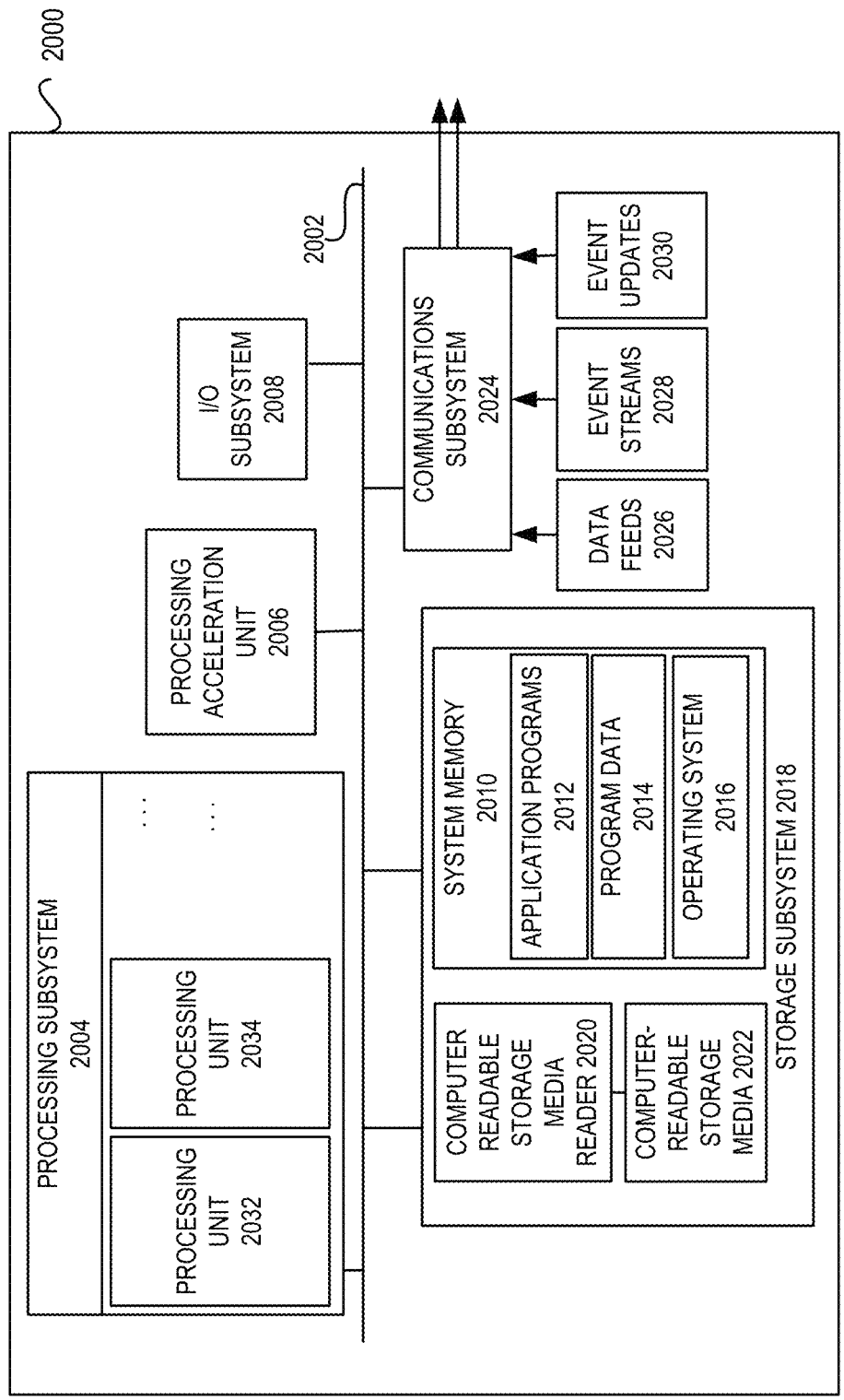
FIG. 20 illustrates an exemplary computer system, in which various embodiments of the present invention may be implemented.

FIG. 20 illustrates an example of computer system 2000. In some examples, computer system 2000 may be used to implement any of the digital assistant or chatbot systems within a distributed environment, and various servers and computer systems described above. As shown in FIG. 20, computer system 2000 includes various subsystems including a processing subsystem 2004 that communicates with a number of other subsystems via a bus subsystem 2002. These other subsystems may include a processing acceleration unit 2006, an I/O subsystem 2008, a storage subsystem 2018, and a communications subsystem 2024. Storage subsystem 2018 may include non-transitory computer-readable storage media including storage media 2022 and a system memory 2010.

Bus subsystem 2002 provides a mechanism for letting the various components and subsystems of computer system 2000 communicate with each other as intended. Although bus subsystem 2002 is shown schematically as a single bus, alternative examples of the bus subsystem may utilize multiple buses. Bus subsystem 2002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P13156.1 standard, and the like.

Processing subsystem 2004 controls the operation of computer system 2000 and may comprise one or more processors, application specific integrated circuits (ASICs), or field programmable gate arrays (FPGAs). The processors may include be single core or multicore processors. The processing resources of computer system 2000 may be organized into one or more processing units 2032, 2034, etc. A processing unit may include one or more processors, one or more cores from the same or different processors, a combination of cores and processors, or other combinations of cores and processors. In some examples, processing subsystem 2004 may include one or more special purpose co-processors such as graphics processors, digital signal processors (DSPs), or the like. In some examples, some or all of the processing units of processing subsystem 2004 may be implemented using customized circuits, such as application specific integrated circuits (ASICs), or field programmable gate arrays (FPGAs).

In some examples, the processing units in processing subsystem 2004 may execute instructions stored in system memory 2010 or on computer readable storage media 2022. In various examples, the processing units may execute a variety of programs or code instructions and may maintain multiple concurrently executing programs or processes. At any given time, some or all of the program code to be executed may be resident in system memory 2010 and/or on computer-readable storage media 2022 including potentially on one or more storage devices. Through suitable programming, processing subsystem 2004 may provide various functionalities described above. In instances where computer system 2000 is executing one or more virtual machines, one or more processing units may be allocated to each virtual machine.

In certain examples, a processing acceleration unit 2006 may optionally be provided for performing customized processing or for off-loading some of the processing performed by processing subsystem 2004 so as to accelerate the overall processing performed by computer system 2000.

I/O subsystem 2008 may include devices and mechanisms for inputting information to computer system 2000 and/or for outputting information from or via computer system 2000. In general, use of the term input device is intended to include all possible types of devices and mechanisms for inputting information to computer system 2000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 2000 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2018 provides a repository or data store for storing information and data that is used by computer system 2000. Storage subsystem 2018 provides a tangible non-transitory computer-readable storage medium for storing the basic programming and data constructs that provide the functionality of some examples. Storage subsystem 2018 may store software (e.g., programs, code modules, instructions) that when executed by processing subsystem 2004 provides the functionality described above. The software may be executed by one or more processing units of processing subsystem 2004. Storage subsystem 2018 may also provide authentication in accordance with the teachings of this disclosure.

Storage subsystem 2018 may include one or more non-transitory memory devices, including volatile and non-volatile memory devices. As shown in FIG. 20, storage subsystem 2018 includes a system memory 2010 and a computer-readable storage media 2022. System memory 2010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2000, such as during start-up, may typically be stored in the ROM. The RAM typically contains data and/or program modules that are presently being operated and executed by processing subsystem 2004. In some implementations, system memory 2010 may include multiple different types of memory, such as static random access memory (SRAM), dynamic random access memory (DRAM), and the like.

By way of example, and not limitation, as depicted in FIG. 20, system memory 2010 may load application programs 2012 that are being executed, which may include various applications such as Web browsers, mid-tier applications, relational database management systems (RDBMS), etc., program data 2014, and an operating system 2016. By way of example, operating system 2016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 2022 may store programming and data constructs that provide the functionality of some examples. Computer-readable media 2022 may provide storage of computer-readable instructions, data structures, program modules, and other data for computer system 2000. Software (programs, code modules, instructions) that, when executed by processing subsystem 2004 provides the functionality described above, may be stored in storage subsystem 2018. By way of example, computer-readable storage media 2022 may include non-volatile memory such as a hard disk drive, a magnetic disk drive, an optical disk drive such as a CD ROM, DVD, a Blu-Ray® disk, or other optical media. Computer-readable storage media 2022 may include, but is not limited to, Zip® drives, flash memory cards, universal serial bus (USB) flash drives, secure digital (SD) cards, DVD disks, digital video tape, and the like. Computer-readable storage media 2022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 2018 may also include a computer-readable storage media reader 2020 that may further be connected to computer-readable storage media 2022. Reader 2020 may receive and be configured to read data from a memory device such as a disk, a flash drive, etc.

In certain examples, computer system 2000 may support virtualization technologies, including but not limited to virtualization of processing and memory resources. For example, computer system 2000 may provide support for executing one or more virtual machines. In certain examples, computer system 2000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 2000. Accordingly, multiple operating systems may potentially be run concurrently by computer system 2000.

Communications subsystem 2024 provides an interface to other computer systems and networks. Communications subsystem 2024 serves as an interface for receiving data from and transmitting data to other systems from computer system 2000. For example, communications subsystem 2024 may enable computer system 2000 to establish a communication channel to one or more client devices via the Internet for receiving and sending information from and to the client devices. For example, when computer system 2000 is used to implement bot system 120 depicted in FIG. 1, the communication subsystem may be used to communicate with a chatbot system selected for an application.

Communication subsystem 2024 may support both wired and/or wireless communication protocols. In certain examples, communications subsystem 2024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1502.XX family standards, or other mobile communication technologies, or any combination thereof), global positioning system (GPS) receiver components, and/or other components. In some examples, communications subsystem 2024 may provide wired network connectivity (e.g., Ethernet) in addition to or instead of a wireless interface.

Communication subsystem 2024 may receive and transmit data in various forms. In some examples, in addition to other forms, communications subsystem 2024 may receive input communications in the form of structured and/or unstructured data feeds 2026, event streams 2028, event updates 2030, and the like. For example, communications subsystem 2024 may be configured to receive (or send) data feeds 2026 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 2024 may be configured to receive data in the form of continuous data streams, which may include event streams 2028 of real-time events and/or event updates 2030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2024 may also be configured to communicate data from computer system 2000 to other computer systems or networks. The data may be communicated in various different forms such as structured and/or unstructured data feeds 2026, event streams 2028, event updates 2030, and the like to one or more databases that may be in communication with one or more streaming data source computers coupled to computer system 2000.

Computer system 2000 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 2000 depicted in FIG. 20 is intended only as a specific example. Many other configurations having more or fewer components than the system depicted in FIG. 20 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
   by execution of a first loader script of a first web component, of a plurality of web components in a web application, calling a registration application programming interface (API) and providing a first component-specific metadata of the first web component to the registration API, wherein one or more web components of the plurality of web components are at different hierarchy levels; and
   by a first execution of the registration API:
      providing a rendering engine with first completed metadata of the first web component, including combining the first component-specific metadata of the first web component with a first web component signature to produce the first completed metadata of the first web component, wherein combining the first component-specific metadata of the first web component with the first web component signature to produce completed metadata of the first web component comprises:
         using a base class implementation determined by input parameters corresponding to the first component-specific metadata to provide one or more properties of the first web component signature other than the first component-specific metadata; and
         loading the first web component signature to the rendering engine;
      storing a first entry in a component registry of the rendering engine that associates a first name of the first web component with the completed metadata; and
      before using the base class implementation, storing an update to a base class to provide additional functionality corresponding to at least one of the one or more properties of the first web component signature of the first web component, wherein the update to the base class is propagated to a set of web applications that are at a hierarchy level of the first web component;

wherein the registration API comprises a proxy API that supports the base class implementation determined by the input parameters corresponding to the first component-specific metadata and also supports one or more other base class implementations determined by other input parameters corresponding to other component-specific metadata.

2. The computer-implemented method of claim 1, wherein providing the rendering engine with the completed metadata of the first web component includes loading the completed metadata to the rendering engine.

3. The computer-implemented method of claim 1, wherein the first component-specific metadata of the first web component includes the first name of the first web component.

4. The computer-implemented method of claim 1, wherein the one or more properties are exposed as attributes on the first name of the first web component.

5. The computer-implemented method of claim 1, wherein the first web component signature indicates at least one method of the first web component or at least one event of the first web component.

6. The computer-implemented method of claim 1, wherein the computer-implemented method further comprises:
by the execution of the first loader script of the first web component, providing a first view model of the first web component to the registration API, wherein the first view model of the first web component includes a first script that calls the base class.

7. The computer-implemented method of claim 6, wherein the first script further includes a first child instance of the base class.

8. The computer-implemented method of claim 1, wherein the computer-implemented method further comprises:
by the execution of the first loader script of the first web component, providing a view of the first web component to the registration API, wherein the view of the first web component comprises a static HTML file.

9. The computer-implemented method of claim 1, wherein the first web component is a field group.

10. The computer-implemented method of claim 1, wherein the computer-implemented method further comprises:
by execution of a second loader script of a second web component calling the registration API and providing a second component-specific metadata of the second web component to the registration API; and
by a second execution of the registration API:
using the base class to further provide one or more parts of a second web component signature other than the second component-specific metadata of the second web component;
providing the rendering engine with a second completed metadata of the second web component, including combining the second component-specific metadata of the second web component with the second web component signature to produce the second completed metadata of the second web component; and
storing a second entry in the component registry of the rendering engine that associates a second name of the second web component with the second completed metadata of the second web component.

11. The computer-implemented method of claim 10, wherein the computer-implemented method further comprises:
by the execution of the second loader script of the second web component, providing a second view model of the second web component to the registration API, wherein the second view model of the second web component comprises a second script that includes a second child instance of the base class.

12. The computer-implemented method of claim 10, wherein:
the first web component and the second web component are used by a document being rendered, and
the second web component is at the hierarchy level of the document as the first web component.

13. The computer-implemented method of claim 10, wherein the second component-specific metadata of the second web component includes the second name of the second web component.

14. A system comprising:
one or more data processors; and
a non-transitory computer-readable storage medium containing instructions that, when executed on the one or more data processors, cause the one or more data processors to perform a set of operations including:
by execution of a first loader script of a first web component, of a plurality of web components in a web application, calling a registration application programming interface (API) and providing a first component-specific metadata of the first web component to the registration API, wherein one or more web components of the plurality of web components are at different hierarchy levels; and
by a first execution of the registration API:
providing a rendering engine with first completed metadata of the first web component, including combining the first component-specific metadata of the first web component with a first web component signature to produce the first completed metadata of the first web component, wherein combining the first component-specific metadata of the first web component with the first web component signature to produce completed metadata of the first web component comprises:
using a base class implementation determined by input parameters corresponding to the first component-specific metadata to provide one or more properties of the first web component signature other than the first component-specific metadata; and
loading the first web component signature to the rendering engine;
storing a first entry in a component registry of the rendering engine that associates a first name of the first web component with the completed metadata; and
before using the base class implementation, storing an update to a base class to provide additional functionality corresponding to at least one of the one or more properties of the first web component signature of the first web component, wherein the update to the base class is propagated to a set of web applications that are at a hierarchy level of the first web component;
wherein the registration API comprises a proxy API that supports the base class implementation determined by the input parameters corresponding to the first component-specific metadata and also supports one or more other base class implementations determined by other input parameters corresponding to other component-specific metadata.

15. The system of claim 14, wherein the set of operations further includes:
by the execution of the first loader script of the first web component, providing a first view model of the first web component to the registration API, wherein the first view model of the first web component comprises a first script that includes a first child instance of the base class.

16. The system of claim 14, wherein the set of operations further includes:
by execution of a second loader script of a second web component, calling the registration API and providing a second component-specific metadata of the second web component to the registration API; and
by a second execution of the registration API:
using the base class to further provide one or more parts of a second web component signature other than the second component-specific metadata of the second web component;
providing the rendering engine with a second completed metadata of the second web component, including combining the second component-specific metadata of the second web component with the second web component signature to produce the second completed metadata of the second web component; and
storing a second entry in the component registry of the rendering engine that associates a second name of the second web component with the second completed metadata of the second web component.

17. The system of claim 16, wherein the set of operations further includes:
by the execution of the second loader script of the second web component, providing a second view model of the second web component to the registration API, wherein the second view model of the second web component comprises a second script that includes a second child instance of the base class.

18. A computer-program product tangibly embodied in a non-transitory machine-readable storage medium, including instructions configured to cause one or more data processors to perform a set of operations including:
by execution of a first loader script of a first web component, of a plurality of web components in a web application, calling a registration application programming interface (API) and providing a first component-specific metadata of the first web component to the registration API, wherein one or more web components of the plurality of web components are at different hierarchy levels; and
by a first execution of the registration API:
providing a rendering engine with first completed metadata of the first web component, including combining the first component-specific metadata of the first web component with a first web component signature to produce the first completed metadata of the first web component, wherein combining the first component-specific metadata of the first web component with the first web component signature to produce completed metadata of the first web component comprises:
using a base class implementation determined by input parameters corresponding to the first component-specific metadata to provide one or more properties of the first web component signature other than the first component-specific metadata; and
loading the first web component signature to the rendering engine;
storing a first entry in a component registry of the rendering engine that associates a first name of the first web component with the completed metadata; and
before using the base class implementation, storing an update to a base class to provide additional functionality corresponding to at least one of the one or more properties of the first web component signature of the first web component, wherein the update to the base class is propagated to a set of web applications that are at a hierarchy level of the first web component;
wherein the registration API comprises a proxy API that supports the base class implementation determined by the input parameters corresponding to the first component-specific metadata and also supports one or more other base class implementations determined by other input parameters corresponding to other component-specific metadata.

19. The computer-program product of claim 18, wherein the set of operations further includes:
by the execution of the first loader script of the first web component, providing a first view model of the first web component to the registration API, wherein the first view model of the first web component comprises a first script that includes a first child instance of the base class.

20. The computer-program product of claim 18, wherein the set of operations further includes:
by execution of a second loader script of a second web component, calling the registration API and providing a second component-specific metadata of the second web component to the registration API; and
by a second execution of the registration API:
using the base class to further provide one or more parts of a second web component signature other than the second component-specific metadata of the second web component;
providing the rendering engine with a second completed metadata of the second web component, including combining the second component-specific metadata of the second web component with the second web component signature to produce the second completed metadata of the second web component; and
storing a second entry in the component registry of the rendering engine that associates a second name of the second web component with the second completed metadata of the second web component.

21. The computer-program product of claim 20, wherein the set of operations further includes:
by the execution of the second loader script of the second web component, providing a second view model of the second web component to the registration API, wherein the second view model of the second web component comprises a second script that includes a second child instance of the base class.

* * * * *

UNITED STATES PATENT AND TRADEMARK OFFICE
CERTIFICATE OF CORRECTION

| | | |
|---|---|---|
| PATENT NO. | : 12,287,841 B2 | Page 1 of 1 |
| APPLICATION NO. | : 17/652025 | |
| DATED | : April 29, 2025 | |
| INVENTOR(S) | : Pang | |

It is certified that error appears in the above-identified patent and that said Letters Patent is hereby corrected as shown below:

In the Specification

In Column 2, Line 29, delete "HTML, document" and insert -- HTML document --, therefor.

In Column 7, Lines 13-14, delete "Composite.register()" and insert -- Composite.register(), --, therefor.

In Column 8, Line 16, delete "Registry.register()" and insert -- Registry.register(). --, therefor.

In Column 10, Line 52, delete "HTML, file." and insert -- HTML file. --, therefor.

In Column 11, Line 59, delete "HTML, file." and insert -- HTML file. --, therefor.

In Column 12, Line 51, delete "iPhone)," and insert -- iPhone®), --, therefor.

Signed and Sealed this
Twenty-second Day of July, 2025

Coke Morgan Stewart
*Acting Director of the United States Patent and Trademark Office*